(12) United States Patent
Fu et al.

(10) Patent No.: US 11,120,115 B2
(45) Date of Patent: Sep. 14, 2021

(54) IDENTIFICATION METHOD AND APPARATUS

(71) Applicant: Advanced New Technologies Co., Ltd., Grand Cayman (KY)

(72) Inventors: Dapeng Fu, Hangzhou (CN); Wenbiao Zhao, Hangzhou (CN); Hong Jin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/162,933

(22) Filed: Jan. 29, 2021

(65) Prior Publication Data

US 2021/0150012 A1 May 20, 2021

Related U.S. Application Data

(63) Continuation of application No. PCT/CN2019/108718, filed on Sep. 27, 2019.

(30) Foreign Application Priority Data

Nov. 5, 2018 (CN) .......................... 201811308672.3

(51) Int. Cl.
*G06F 21/32* (2013.01)
*G06F 21/31* (2013.01)
(Continued)

(52) U.S. Cl.
CPC ............ *G06F 21/32* (2013.01); *G06F 21/316* (2013.01); *G06K 9/6256* (2013.01);
(Continued)

(58) Field of Classification Search
CPC ....... G06F 21/32; G06F 21/316; G06N 20/00; G06N 7/005; G06K 9/6297; G06K 9/6256
See application file for complete search history.

(56) References Cited

U.S. PATENT DOCUMENTS

| 9,355,234 B1 * | 5/2016 | Magi Shaashua ...... G06F 21/32 |
| 2003/0051147 A1 * | 3/2003 | Maeda .................... G06F 21/32 |
| | | 713/186 |

(Continued)

*Primary Examiner* — Aaron W Carter
(74) *Attorney, Agent, or Firm* — Shun Yao; Park, Vaughan, Fleming & Dowler LLP

(57) ABSTRACT

One embodiment provides an identification method and system. The system obtains attribute features of a user, determines a first set of identification products and identification success rates thereof based on the attribute features of the user and a first machine-learning model for determining identification security, and generates a first set of identification product combinations, a respective identification product combination comprising two different identification products. The system selects, from the first set of identification product combinations, a second set of identification product combinations based on the identification success rates of the first set of identification products; and selects, from the second set of identification product combinations, a third set of identification product combinations based on the attribute features of the user and a second machine-learning model for determining identification applicability, thereby facilitating identification of the user using at least one of the third set of the identification product combinations.

26 Claims, 10 Drawing Sheets

(51) Int. Cl.
*G06N 20/00* (2019.01)
*G06K 9/62* (2006.01)
*G06N 7/00* (2006.01)

(52) U.S. Cl.
CPC .......... *G06K 9/6297* (2013.01); *G06N 7/005* (2013.01); *G06N 20/00* (2019.01)

(56) References Cited

U.S. PATENT DOCUMENTS

| | | | |
|---|---|---|---|
| 2008/0260239 A1* | 10/2008 | Han | G06K 9/4614 382/156 |
| 2018/0260615 A1* | 9/2018 | Chauhan | G06K 9/6224 |
| 2019/0311114 A1* | 10/2019 | Mei | G06N 20/00 |
| 2019/0392125 A1* | 12/2019 | Lee | G06F 21/6245 |
| 2020/0117787 A1* | 4/2020 | Zhou | G06F 21/40 |
| 2020/0184053 A1* | 6/2020 | Kursun | G06K 9/00899 |

* cited by examiner

Identification security model coverage

Individual first identification products

| First identification product | First identification success rate |
|---|---|
| Face | 0.7 |
| Short message | 0.6 |
| KBA | 0.5 |
| Security | 0.4 |

First identification product combinations

| First identification product combination | Second identification success rate |
|---|---|
| Face + short message | 0.88 |
| KBA + security | 0.7 |
| Short message + security | 0.76 |
| KBA + short message | 0.8 |

Identification security

Identification applicability model coverage

Individual second identification products

| Second identification product | Third identification success rate |
|---|---|
| Face | 0.5 |
| Short message | 0.5 |
| KBA | 0.6 |
| Security | 0.7 |

Second identification product combinations

| Second identification product combination | Fourth identification success rate |
|---|---|
| Face + short message | 0.75 |
| Short message + security | 0.85 |
| KBA + short message | 0.8 |

Identity verification applicability

FIG. 4b

IDENTIFICATION METHOD AND APPARATUS

RELATED APPLICATION

Under 35 U.S.C. § 120 and § 365(c), this application is a continuation of PCT Application No. PCT/CN2019/108718, entitled "IDENTIFICATION METHOD AND APPARATUS," by inventors Dapeng Fu, Wenbiao Zhao, and Hong Jin, filed 27 Sep. 2019, which claims priority to Chinese Patent Application No. 201811308672.3, filed on 5 Nov. 2018.

TECHNICAL FIELD

The present application relates to the technical field of information processing, and in particular relates to an identification method and apparatus, a computing device, and a storage medium.

BACKGROUND

To prevent and control theft risks, financial applications may output a certain identification method targeted at some users in some scenarios to verify the real identities of the users and reduce the risk of user accounts being stolen.

In current technologies, the identification method is generally a single and fixed method. This identification method has two disadvantages: one is that a single identification method may have a risk of failing due to malicious attacks; the other is that a single identification method may not be applicable to low-risk users. For example, a user may prefer to employ face recognition as the identification method; if a dynamic questionnaire based on the user's memory is pushed for identification, then an identification of the user may fail, thus affecting user experience.

SUMMARY

In view of this, one or more embodiments of the present application provide an identification method and apparatus, a computing device, and a storage medium to solve the technical defects existing in current technologies.

One embodiment provides a system and method for user identification. During operation, the system obtains attribute features of a user, determines a first set of identification products and identification success rates thereof based on the attribute features of the user and a first machine-learning model for determining identification security, and generates a first set of identification product combinations, a respective identification product combination comprising two different identification products selected from the first set identification products. The system selects, from the first set of identification product combinations, a second set of identification product combinations based on the identification success rates of the first set of identification products; and selects, from the second set of identification product combinations, a third set of identification product combinations based on the attribute features of the user and a second machine-learning model for determining identification applicability, thereby facilitating identification of the user using at least one of the third set of the identification product combinations.

In a variation on this embodiment, selecting, from the first set of identification product combinations, the second set of identification product combinations comprises: computing combined identification success rate for each of the first set of identification product combinations based on the identification success rate of each identification product; and in response to the combined identification success rate of an identification product combination being greater than a first threshold, including the identification product combination in the second set of identification product combinations.

In a variation on this embodiment, selecting, from the second set of identification product combinations, the subset of identification product combinations comprises: forming a second set of identification products using identification products included in the second set of identification product combinations; for each identification product in the second set of identification products, determining an applicability-related identification success rate by inputting the identification product and the attribute features of the user into the second machine-learning model for determining identification applicability; computing a combined applicability-related identification success rate for each of the second set of identification product combinations based on the applicability-related identification success rate of each identification product in the second set of identification products; and in response to the combined applicability-related identification success rate of an identification product combination being greater than a second threshold, including the identification product combination in the subset of identification product combinations.

In a variation on this embodiment, forming the second set of identification products further comprising applying a filter based on a predetermined security control policy.

In a variation on this embodiment, determining the first identification products and the identification success rates thereof comprises: determining a long-term identification success rate of a respective identification product based on the attribute features of the user; determining a short-term identification success rate of the identification product corresponding to a target time period; and using a greater value of the long-term and short-term identification success rates of the identification product as the identification success rate of the first identification product.

In a further variation, determining the short-term identification success rate of the identification product comprises: dividing potential risks associated with the identification product within the target time period into risk groups; statistically computing an identification success rate of each risk group; and weighing identification success rates of the risk groups to obtain the short-term identification success rate of the identification product.

In a variation on this embodiment, the system trains the first machine-learning model for determining identification security, which comprises: obtaining identification security samples and first labels, wherein a respective identification security sample comprises a historical breakthrough event, an identification product corresponding to the historical breakthrough event, and historical attribute features of a user, and wherein a first label corresponding to the respective identification security sample indicates whether identification performed using the identification product corresponding to the historical breakthrough event is successful or not; and training the first machine-learning model for determining identification security using the identification security samples and the first labels.

In a variation on this embodiment, the first machine-learning model for determining identification security comprises a Markov Chain Monte Carlo (MCMC) model.

In a variation on this embodiment, the system trains the second machine-learning model for determining identification applicability, which comprises: obtaining identification applicability samples and second labels, wherein a respective identification applicability sample comprises a historical non-breakthrough event, identification product corresponding to the historical non-breakthrough event, and historical attribute features of a user, and wherein a second label corresponding to the respective identification applicability sample indicates whether identification performed using the identification product corresponding to the historical non-breakthrough event is successful or not; and training the second machine-learning model for determining identification applicability using the identification applicability samples and the second labels.

In a variation on this embodiment, the second machine-learning model for determining identification applicability comprises a random forest model.

One embodiment of the present application discloses an identification method. The identification method includes:

obtaining attribute features of a user;

inputting the attribute features of the user into a trained identification security model, and obtaining first identification products corresponding to the attribute features of the user and first identification success rates of the first identification products according to output results;

generating first identification product combinations by any two of the first identification products, computing second identification success rates of the first identification product combinations according to the first identification success rates of the first identification products, and obtaining, in the first identification product combinations, second identification products in which the second identification success rates are greater than a first threshold;

inputting the second identification products and the attribute features of the user into a trained identification applicability model to obtain third identification success rates of the second identification products;

performing computation to obtain fourth identification success rates of the second identification product combinations according to the third identification success rates of the second identification products;

outputting second identification product combinations having a fourth identification success rate greater than a second threshold.

One embodiment of the present application discloses a method for generating an identification security model. The method includes:

obtaining identification security samples and first labels, the identification security samples including historical breakthrough events, identification products corresponding to the historical breakthrough events and historical attribute features of a user, the first labels indicating whether identification performed by using the identification products corresponding to the historical breakthrough events is successful or not;

establishing an identification security model, and inputting the identification security samples and the first labels into the identification security model to perform training; and storing the identification security model.

One embodiment of the present application discloses a method for generating an identification applicability model. The method includes:

obtaining identification applicability samples and second labels, the identification applicability samples including historical non-breakthrough events, identification products corresponding to the historical non-breakthrough events and historical attribute features of a user, the second labels indicating whether identification performed by using the identification products corresponding to the historical non-breakthrough events is successful or not;

establishing an identification applicability model, and inputting the identification applicability samples and the second labels into the identification applicability model to perform training; and storing the identification applicability model.

One embodiment of the present application discloses an identification apparatus. The apparatus includes:

an attribute feature obtaining module, configured to obtain attribute features of a user;

a first identification security processing module, configured to input the attribute features of the user into a trained identification security model, and obtain, according to output results, first identification products corresponding to the attribute features of the user and first identification success rates of the first identification products;

a second identification security processing module, configured to generate first identification product combinations by any two of the first identification products, compute second identification success rates of the first identification product combinations according to the first identification success rates of the first identification products, and obtain, in the first identification product combinations, second identification products having a second identification success rate greater than a first threshold;

a first identification applicability processing module, configured to input the second identification products and the attribute features of the user into a trained identification applicability model to obtain third identification success rates of the second identification products;

a second identification applicability processing module, configured to perform computation to obtain fourth identification success rates of second identification product combinations according to the third identification success rates of the second identification products, and output second identification product combinations having a fourth identification success rate greater than a second threshold.

One embodiment of the present application discloses an apparatus for generating an identification security model. The apparatus includes:

a first obtaining module, configured to obtain identification security samples and first labels, the identification security samples including historical breakthrough events, identification products corresponding to the historical breakthrough events and historical attribute features of a user, the first labels indicating whether identification performed by using the identification products corresponding to the historical breakthrough events is successful or not;

a first training module, configured to establish an identification security model, and input the identification security samples and the first labels into the identification security model to perform training; and a first storage module, configured to store the identification security model.

One embodiment of the present application discloses an apparatus for generating an identification applicability model. The apparatus includes:

a second obtaining module, configured to obtain identification applicability samples and second labels, the identification applicability samples including historical non-breakthrough events, identification products corresponding to the historical non-breakthrough events and historical attribute features of a user, the second labels indicating whether identification performed by using the identification products corresponding to the historical non-breakthrough events is successful or not;

a second training module, configured to establish an identification applicability model, and input the identification applicability samples and the second labels into the identification applicability model to perform training; and a second storage module, configured to store the identification applicability model.

One embodiment of the present application discloses a computing device, including a memory, a processor, and computer instructions that are stored on the memory and that can be executed by the processor; the processor, when executing the instructions, implements the steps of the identification method, or the method for generating the identification security model, or of the method for generating the identification applicability model.

One embodiment of the present application discloses a computer-readable storage medium on which computer instructions are stored; the instructions are executed by a processor to implement the steps of the identification method, or the method for generating the identification security model, or of the method for generating the identification applicability model.

In the identification method and apparatus, computing device, and storage medium provided by the present application, after the attribute features of the user are obtained, the features are sequentially input into a trained identification security model and identification applicability model, and finally second identification product combinations, which are generated by any two of the second identification product and have a fourth identification success rate greater than the second threshold, are output, thus improving security and improving user experience.

BRIEF DESCRIPTION OF THE DRAWINGS

FIG. 4b is a result presentation diagram of identification success rates of identification methods according to one or more embodiments of the present application.

DETAILED DESCRIPTION OF THE EMBODIMENTS

Figure 1:
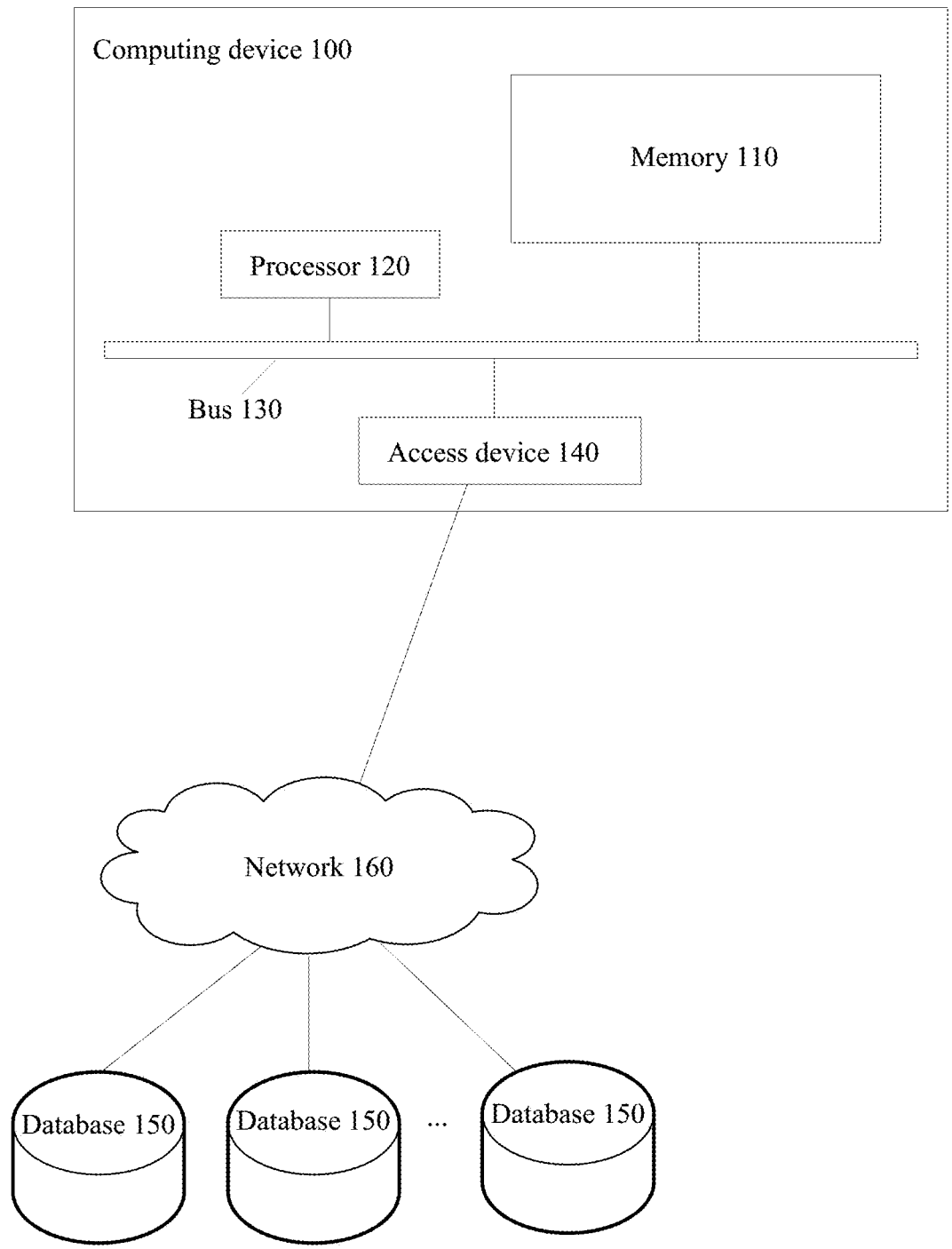
FIG. 1 is a structural schematic diagram of a computing device according to one or more embodiments of the present application.

Many specific details will be described below in the following description to facilitate a full understanding of the present application. However, the present application can be implemented in many other modes different from those described herein, and those skilled in the art can make similar promotion without departing from the connotation of the present application. Therefore, the present application is not limited by the specific implementation disclosed below.

The terms used in one or more embodiments of the present application are for the purpose of describing specific embodiments only, and are not intended to limit one or more embodiments of the present application. The singular forms of "a," "the," and "said" used in one or more embodiments of the present application and the appended claims are also intended to include the plural forms, unless the context clearly indicates other meanings. It should also be understood that the term "and/or" as used in one or more embodiments of the present application refers to and includes any or all possible combinations of one or more associated listed items.

It should be understood that although the terms first, second, and the like may be used to describe different information in one or more embodiments of the present application, such information should not be limited to these terms. These terms are only used to distinguish the same type of information from each other. For example, without departing from the scope of one or more embodiments of the present application, "first" may also be referred to as "second," and similarly, "second" may be referred to as "first." Depending on the context, the word "if" as used here may be interpreted as "when . . . ," "while . . . ," or "in response to determining."

First, the terminology involved in one or more embodiments of the present application is explained.

Identification: i.e., a shortened term for identity verification, which is performed when a user uses an application in order to guarantee the security of a user account. For example, in financial applications, in order to prevent the risk of theft, identification is performed when a user logs in or pays.

Identification product: products used for identification. For example, identification products based on information include privacy questions, reserved information, etc.; identification products based on public key infrastructure (PKI) technology include payment shield, digital certificate, etc.; identification products based on one-time password (OTP) technology include mobile phone Baoling, one-key confirmation, dynamic short message verification code, etc.; identification products based on biological features include fingerprints, etc.; identification products based on behavioral features include handwriting, etc.

Markov Chain Monte Carlo (MCMC): a Monte Carlo model simulated by a computer under the framework of Bayesian theory. The algorithm of the model is to introduce the Markov process into Monte Carlo simulation to realize the dynamic simulation of sampling distribution changing with the simulation, which makes up for the defect that the traditional Monte Carlo integration can only simulate statically.

Random Decision Forests: in machine leaning, Random Decision Forest is classifier including a plurality of classification trees. The classification trees are combined into random forests, that is, the use of variables (columns) and data (rows) is randomized to generate many classification trees, and then the results of classification trees are summarized.

Breakthrough events: events that should be intercepted but are not intercepted, such as theft events.

The present application provides an identification method and apparatus, a computing device, and a computer-readable storage medium, which will be described below in detail one by one.

FIG. 1 is a structural diagram of a computing device according to one embodiment of the present application. The components of computing device 100 include, but are not limited to, a memory 110 and a processor 120. Processor 120 is connected with memory 110 through a bus 130, a database 150 is used to store data, and a network 160 is used to receive the data stored in database 150.

Computing device 100 may further include an access device 140 which enables computing device 100 to communicate via one or more networks 160. Examples of these networks include a public switched telephone network (PSTN), a local area network (LAN), a wide area network (WAN), a personal area network (PAN), or a combination of communication networks such as the Internet. Access device 140 may include one or more of any type of network interface (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, etc.

In one embodiment of the present application, the above mentioned and other components not illustrated in FIG. 1 of computing device 100 may also be connected to each other, for example, through a bus. It should be understood that the structural diagram of the computing device illustrated in FIG. 1 is for the purpose of example only, and not for the purpose of limiting the scope of the present application. Those skilled in the art may add or replace other components as required.

Computing device 100 may be any type of stationary or mobile computing device, including a mobile computer or mobile computing device (for example, a tablet computer, a personal digital assistant, a laptop computer, a notebook computer, a net-book, etc.), a mobile phone (for example, a smart phone), a wearable computing device (for example, a smartwatch, smartglasses, etc.), or other types of mobile devices, or stationary computing devices such as a desktop computer or PC. Computing device 100 may also be a mobile or stationary server.

Figure 2:
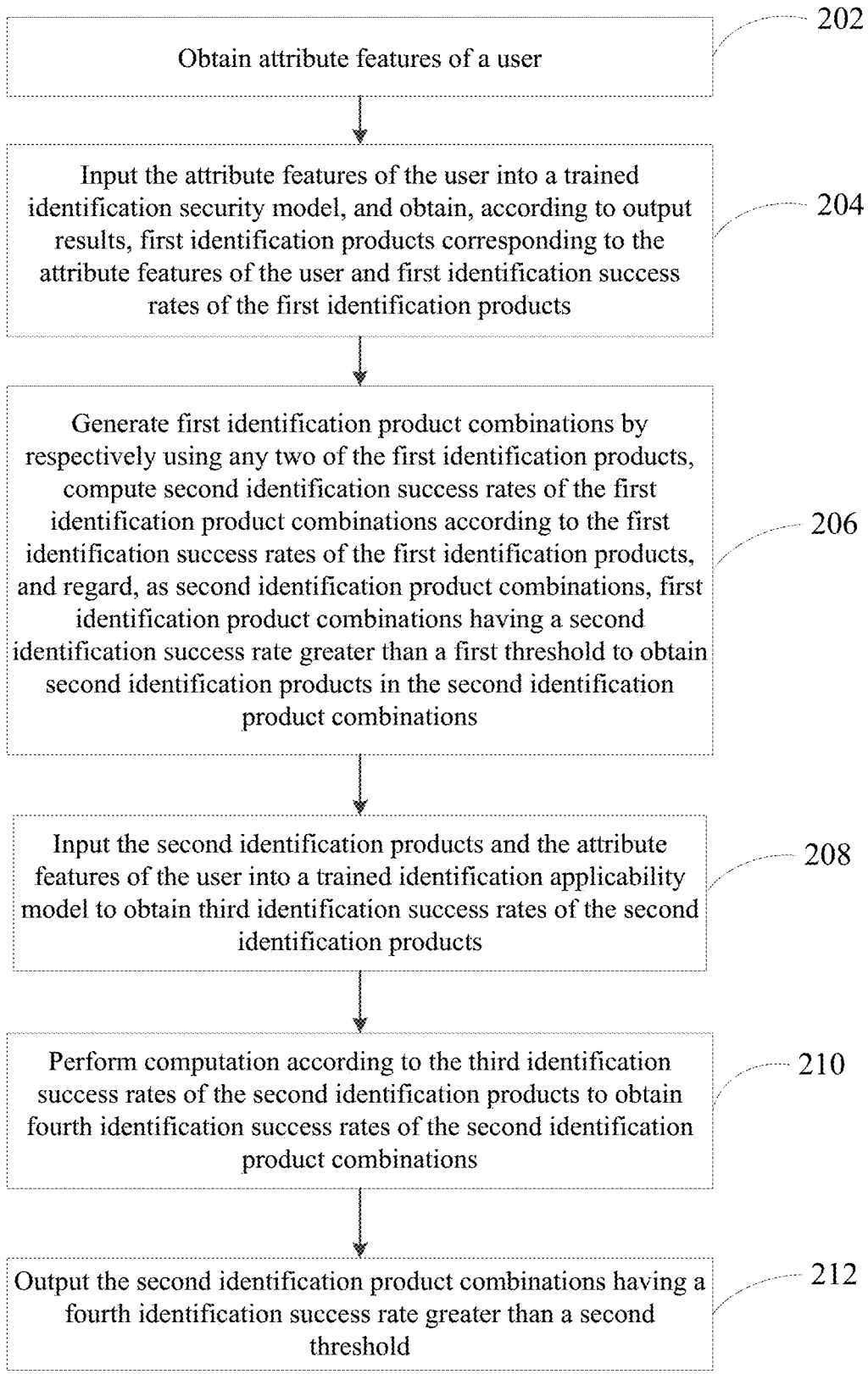
FIG. 2 is a flowchart of an identification method according to one or more embodiments of the present application.

Processor 120 can execute the steps in the method illustrated in FIG. 2. FIG. 2 illustrates a schematic flowchart of an identification method according to one or more embodiments of the present application, which includes step 202 to step 212:

202, obtaining attribute features of a user.

Specifically, the attribute features of the user may include a variety of features, for example, user information, including gender, age, city, registration duration, card binding, grade, etc.; user level, including education level, occupation, wealth, credit, consumption, real estate, vehicles, etc.; user behavior, including historical identification, purchase behavior, security awareness, etc.; user preference, including network preference, wireless preference, etc; user equipment, including brand, contact list, version information, system, etc.; user scenario, including home, public places, company, hotel, taxi, code scanning, transfer, etc.

204, inputting the attribute features of the user into a trained identification security model, which is a machine-learning model that can determine identification security (i.e., the level of security provided by the identification product), and obtaining, according to output results, first identification products corresponding to the attribute features of the user and first identification success rates of the first identification products. A Training samples used in the training of the identification security model are all historical breakthrough events. Therefore, the essence of inputting the attribute features of the user into the identification security model is to assume that the user's operation event is a breakthrough event, and then obtain the first identification success rates of the first identification products corresponding to the user, so as to determine identification products applicable to the user.

Figure 3:
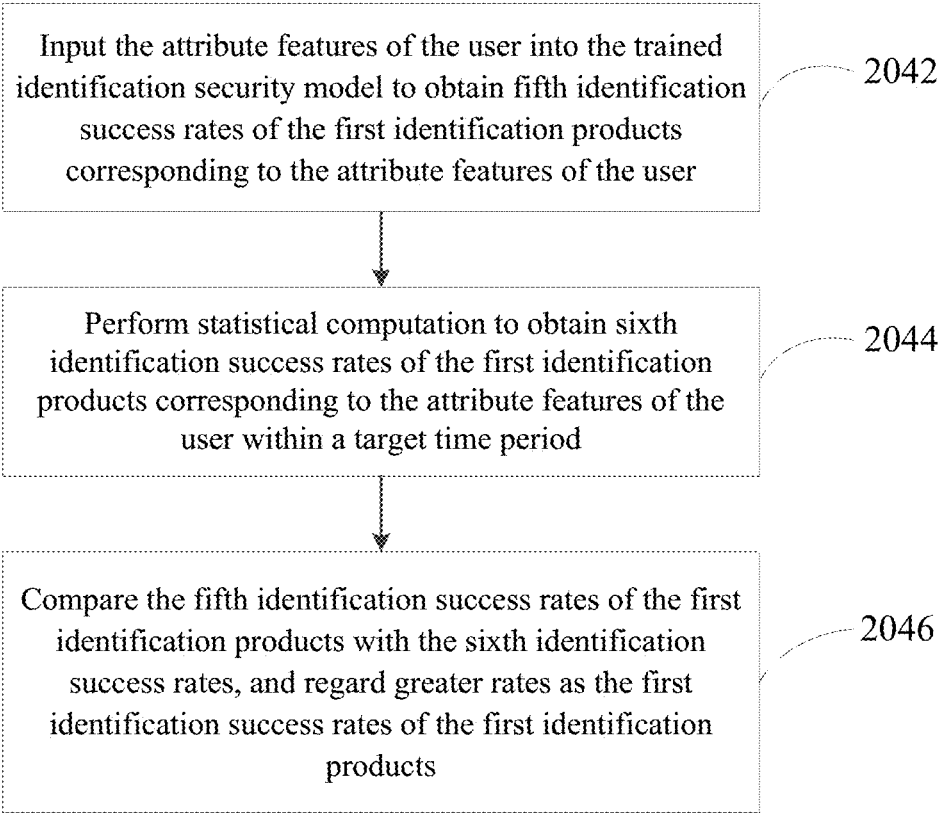
FIG. 3 is a flowchart of an identification method according to one or more embodiments of the present application.

Specifically, referring to FIG. 3, step 204 includes the following steps:

2042, inputting the attribute features of the user into the trained identification security model to obtain fifth identification success rates of the first identification products corresponding to the attribute features of the user.

2044, statistically computing sixth identification success rates of the first identification products corresponding to the attribute features of the user within a target time period.

Specifically, statistically computing the sixth identification success rates of the first identification products corresponding to the attribute features of the user within the target time period in step 2044 includes:

dividing risks within the target time period into risk groups;

statistically computing an identification success rate of each risk group corresponding to the first identification products, and weighing the identification success rate of each risk group to obtain the six identification success rates of the first identification products.

The target time period may be set according to the demand. For example, the target time period is set as the latest ten days.

The fifth identification success rates are different from the sixth identification success rates. The fifth identification success rates represent the long-term risks of the first identification products, and the sixth identification success rates represent the short-term risks of the first identification products. The reason for setting the fifth identification success rates and the sixth identification success rates is that it is difficult for the existing data system to cover all the events, for example, the scenario that the user communicates with the dark industry person offline and is deeply cheated, and the user actively divulges information. By statically computing the fifth identification success rates and the sixth identification success rates, the performance of the identification security model is improved.

The sixth identification success rates of the first identification products are obtained statistically. When the sixth identification success rates of the first identification products are statistically computed, the risks corresponding to the sixth identification success rates need to be designed according to the factors that are easily broken through of different first identification products, and the sixth identification success rates are computed according to risk scores. Table 1 lists breakthrough factors of several different first identification products, and Table 2 lists risk statistics designed according to the breakthrough factors of different first identification products. In Table 2, risks are classified according to behavior, equipment, environment, user, and transaction, and then a risk score corresponding to each first identification product is statistically computed, and then the sixth identification success rates of the first identification products are statistically computed.

TABLE 1

| First identification product | Breakthrough factors |
|---|---|
| KBA | 1) Semi-dynamic information; output information cannot be easily transmitted; and does not easily occur in a telecommunication fraud scenario; 2) Under the situation of serious information leakage, account stealing and emptying situations will be serious; |
| Code scanning authentication | 1) Semi-dynamic information; and account stealing cases do not easily occur, and the occurred cases are changes of bound mobile phones at an early stage; 2) Not enough attention is paid to code scanning and a fraud easily occurs; |
| Security questions | 1) Static information; and account emptying cases easily occur; 2) Have excellent effects in preventing telecommunication fraud caused by mobile phone loss; |
| Account phone authentication | 1) Account emptying cases mainly include changes of bound mobile phones at an early stage; 2) Not enough attention is paid to phone calls and lots of fraud cases; |
| Bound mobile phone | 1) Mobile phone Trojans exist, and cases mainly include account emptying and changes of bound mobile phones. 2) It adopts dynamic information, and the number of social work and fishing cases is relatively not high. 3) Increased attention is paid to short messages at present and the breakthrough rate decreases. |
| Credible mobile phone | It is similar to bound mobile phone. |
| Face | 1) The security level is high but the experience is not good. 2) It adopts static information that can be easily obtained and simulated by advanced thief. 3) Fraud cases possibly happen. |

TABLE 2

| | Behavior | Equipment | Environment | User | Transaction |
|---|---|---|---|---|---|
| Risk | Whether was SMS/phone number divulged recently? | Umid/Apdid associated authentication mode | The city of code scanning authentication is different from the city of payment. | Whether did card binding happen recently by using the same certificate? | Operation channel |
| | Whether was the password divulged recently? | Number of accounts adopting Umid/Apdid associated identical authentication mode | IP associated authentication pass mode | Number of associated accounts | Scenario |
| | Whether were the security questions divulged recently? | Number of users who pass/do not pass Umid/Apdid associated identical authentication mode | Number of accounts adopting IP associated identical authentication mode | Whether is non-jailbroken IOS equipment used stably? | Type of identification mode (dynamic, static, semi-dynamic) |
| | Whether was certificate information divulged recently? | Success rate of Umid/Apdid associated identical authentication mode | Number of users who pass/do not pass IP associated identical authentication mode | Whether is non-jailbroken PC equipment used stably? | Similarity of identification modes |
| | Whether was express card information divulged recently? | | Success rate of IP associated identical authentication mode | Age | Number of authentication mode breakthrough cases |
| | Whether was there a KBA pass record? | | Different provinces | Gender | Risk type |
| | Whether was there a query transaction record recently? | | | Account activity level | |
| | Whether was account homepage/fortune page information browsed | | | | |

TABLE 2-continued

| Behavior | Equipment | Environment | User | Transaction |
| --- | --- | --- | --- | --- |
| recently? List of information about no pass of past authentication | | | | |

2046, compare the fifth identification success rates of the first identification products with the sixth identification success rates, and use the greater of the two rates as the first identification success rates of the first identification products.

For example, in a specific implementation solution, by computing the fifth identification success rate and the sixth identification success rate, the fifth identification success rate of one first identification product is 0.8 and the sixth identification success rate is 0.9. Thus, the sixth identification success rate is larger than the fifth identification success rate. The sixth identification success rate 0.9 of the first identification product is regarded as the first identification success rate of the first identification product for subsequent computation, thus avoiding recent great batch risks.

206, use any two of the first identification products to generate first identification product combinations, and compute second identification success rates of the first identification product combinations according to the first identification success rates of the first identification products, and then the first identification product combinations having a identification success rate greater than a first threshold are regarded as second identification product combinations to obtain second identification products in the second identification product combinations. An identification product combination can be used for performing two-factor authentication of users. In other words, the two identification products in the combination can be used together to verify the identity of a user.

It should be noted that second identification product combinations are subsets of the first identification product combinations. Ideally, the first identification product combinations are identical to the second identification product combinations. The second identification products are subsets of the first identification products. Ideally, the number of the first identification products is the same as the number of the second identification products.

Specifically, the second identification success rates of the first identification product combinations are computed through the following formula:

$$P(A+B)=1-(1-P(A))*(1-P(B))$$

where $P(A+B)$ is the second identification success rate of a first identification product combination; and $P(A)$ and $P(B)$ are respectively the first identification success rates of first identification products A and B. The identification success rate of an identification product combination can also referred to as a combined identification process rate.

In this step, the first identification product combinations having a second identification success rate greater than a first threshold are output as second identification product combinations, thus improving the security of identification compared with the technical solution of outputting a single first identification product.

In this step, the first threshold may be set according to the practical need. For example, the first threshold is set to 0.8. The first identification products in the first identification product combinations having a second identification success rate greater than 0.8 are regarded as the second identification products.

Optionally, after obtaining the second identification products in the second identification product combinations, the method further includes:

filtering the obtained second identification products according to a preset security control policy, and inputting the filtered second identification products into a trained identification applicability model.

The security control policy is preset to filter out second identification products that do not match the user.

For example, if a mobile device of the user is old and there is no front camera, then the identification product of face verification is not applicable to the user.

208, input the second identification products and the attribute features of the user into the trained identification applicability mode, which is a machine-learning model that can determine identification applicability (i.e., how applicable the identification product is to the user), to obtain third identification success rates of the second identification products.

In the present embodiment, by inputting the second identification products into the identification applicability model, whether the second identification products are applicable to the user can be determined.

In this step, the identification applicability model may be various models, such as a random forest algorithm model, then the scores of F1 Score, KS and AUC are obtained, and then the third identification success rates of the second identification products in the second identification product combinations are obtained.

210, obtaining fourth identification success rates of the second identification product combinations by performing computation according to the third identification success rates of the second identification products.

In this step, after the third identification success rates of the second identification products are obtained, the fourth identification success rates of the second identification product combinations are computed through a formula.

Specifically, the fourth identification success rates of the second identification product combinations are computed through the following formula:

$$P(C+D)=1-(1-P(C))*(1-P(D))$$

where $P(C+D)$ is the fourth identification success rate of a second identification product combination; and $P(C)$ and $P(D)$ are respectively the third identification success rates of the second identification products.

212, outputting second identification product combinations having a fourth identification success rate greater than a second threshold.

In this step, the second threshold may be set according to the practical need. For example, the second threshold is set to 0.9, and then the second identification product combinations having a fourth identification success rate greater than 0.9 are output.

For example, assuming that the second identification products include face verification and short message verification, the third identification success rate of face verification is 0.6 and the third identification success rate of short message verification is 0.8, it can be computed that the fourth identification success rate of the second identification product combination of face verification+short message verification is 0.92. Thus, the second identification product combination of face verification+short message verification is output.

In the identification method provided by the present application, after the attribute features of the user are obtained, the features are sequentially input into the trained identification security model and identification applicability model, and finally second identification product combinations having a fourth identification success rate greater than the second threshold and generated by any two of the second identification products are output, thus improving security and improving user experience.

In addition, by using the identification security model, assuming that the event of the user is a secure event, the first identification success rates of the first identification products corresponding to the user are obtained, thus obtaining the first identification products and first identification product combinations that are applicable to the user and have higher identification security.

By using the identification applicability model, assuming that the event of the user is a non-secure event, the third identification success rates of the second identification products corresponding to the user are obtained, thus obtaining the second identification products and second identification product combinations that are applicable to the user and have higher identification applicability.

Because two different machine-learning models (i.e., the identification security model and the identification applicability model), both the security and the applicability of identification products are considered when choosing an identification product combination for two-factor user authentication. The selected identification product combination(s) not only can meet the security requirement but also can be easily applied to enhance user experience.

Figure 4A:
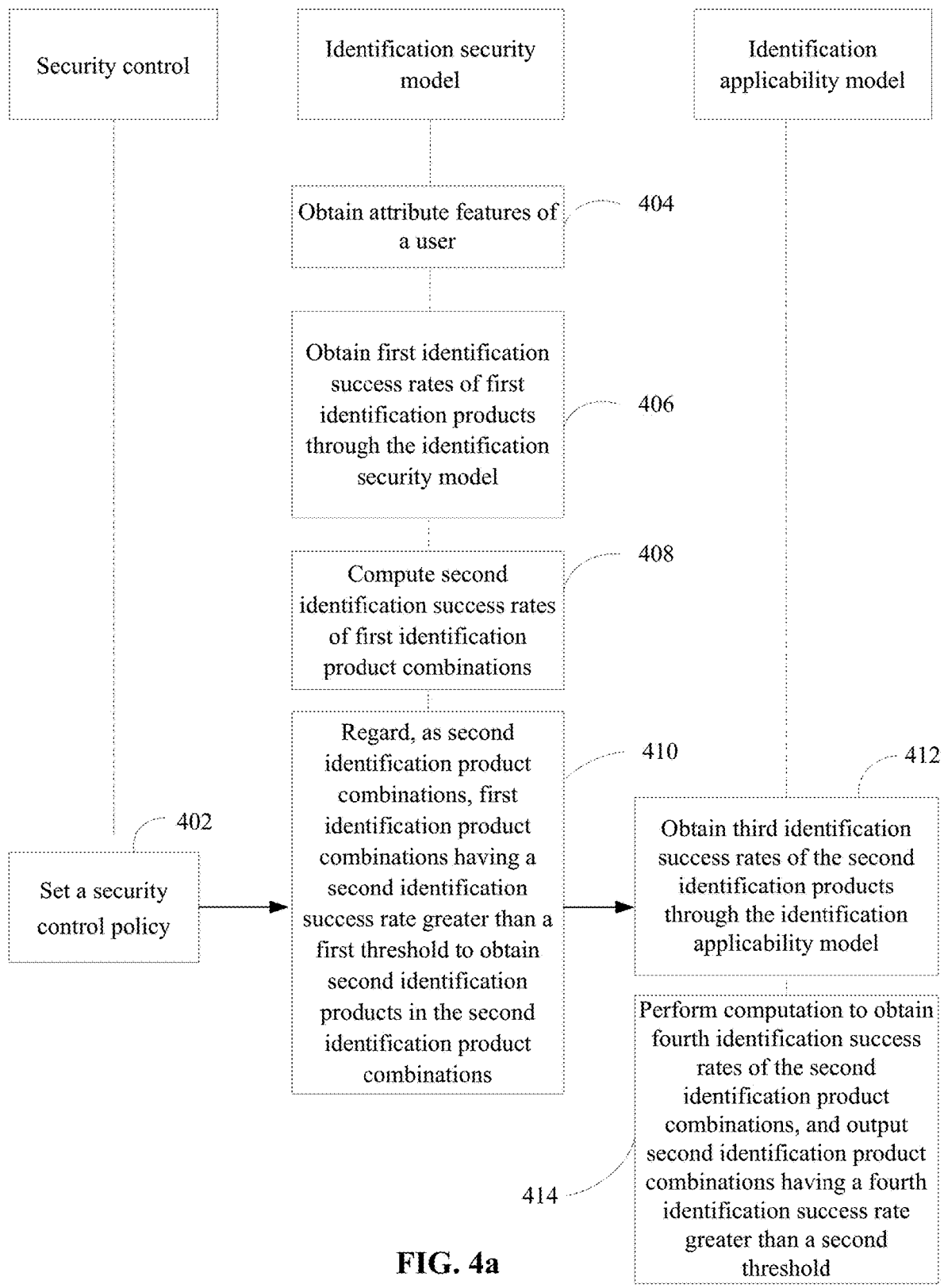
FIG. 4a is a flowchart of an identification method according to one or more embodiments of the present application.

In order to facilitate the understanding of the technical solution recorded herein, a specific example is given below. Refer to FIG. 4a and FIG. 4b. FIG. 4b illustrates a result presentation diagram of identification success rates obtained using the identification method according to the present application.

Referring to FIG. 4a, the identification method according to the present embodiment includes the following steps:

402, setting a security control policy.

404, obtaining attribute features of a user.

406, obtaining first identification success rates of first identification products through an identification security model.

In the present embodiment, the first identification products corresponding to the user include face, short message, knowledge-based authentication (KBA), and security.

Referring to FIG. 4b, after computation, it is obtained that the first identification success rate of face is 0.7, the first identification success rate of short message is 0.6, the first identification success rate of KBA is 0.5, and the first identification success rate of security is 0.4.

408, computing second identification success rates of first identification product combinations.

Referring to the above embodiment, the second identification success rates of the first identification product combinations are computed according to the first identification success rates of the first identification products.

Referring to FIG. 4b, after computation, it is obtained that the second identification success rate of face+short message is 0.88, the second identification success rate of KBA+security is 0.7, the second identification success rate of short message+security is 0.76, and the second identification success rate of KBA+short message is 0.8.

410, using first identification product combinations having a second identification success rate greater than a first threshold as second identification product combinations to obtain second identification products in the second identification product combinations.

In the present embodiment, the first threshold is selected to be 0.7, and the first identification product combinations having a second identification success rate greater than 0.7 are used as the second identification product combinations to obtain the second identification products in the second identification product combinations.

According to the above results, the second identification product combinations include face+short message, short message+security, and KBA+short message. The second identification products include face, short message, KBA, and security.

412, obtaining third identification success rates of the second identification products through an identification applicability model.

The second identification products obtained in step 410 need to be filtered by the security control policy in step 402, and then the second identification products to-be-input into the identification applicability model are obtained.

Referring to FIG. 4b, after computation, it is obtained that the third identification success rate of face is 0.5, the third identification success rate of short message is 0.5, the third identification success rate of KBA is 0.6, and the third identification success rate of security is 0.7.

414, computing fourth identification success rates of the second identification product combinations, and outputting second identification product combinations having a fourth identification success rate greater than a second threshold.

Referring to FIG. 4b, according to the third identification success rates of the second identification products, it is computed that the fourth identification success rate of face+short message is 0.75, the fourth identification success rate of short message+security is 0.85, and the fourth identification success rate of KBA+short message is 0.8.

In the present embodiment, the second threshold is selected to be 0.75. The second identification product combinations having a fourth identification success rate greater than 0.75, which include the combination of short message+security and the combination of KBA+short message, are output for selection by the user.

If the user selects the second identification product combination of short message+security, the second identification product combination of short message+security will be loaded for identification in the process that the user uses the application.

Figure 5:
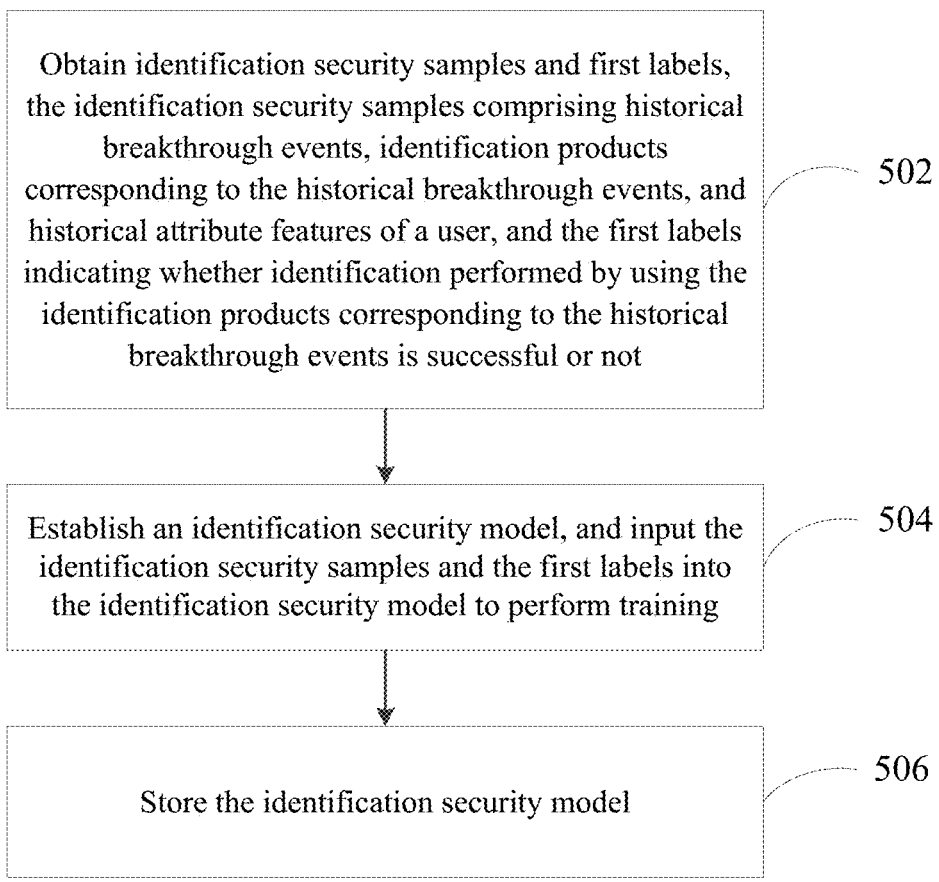
FIG. 5 is a flowchart of a method for generating an identification security model according to one or more embodiments of the present application.

One embodiment of the present application further discloses an apparatus for generating an identification security model. Referring to FIG. 5, the apparatus includes:

502, obtaining identification security samples and first labels, the identification security samples include historical breakthrough events, identification products corresponding to the historical breakthrough events, and historical attribute features of a user, and the first labels indicating whether identification performed by using the identification products corresponding to the historical breakthrough events is successful or not.

It can be seen from this step that the samples of the identification security model include black samples, that is, historical breakthrough events in which identification passes; and white samples, that is, historical breakthrough events in which identification does not pass.

504, establishing an identification security model, and inputting the identification security samples and the first labels are input into the identification security model to perform training.

506, storing the identification security model.

In practice, the measurement of the security of a single identification product needs to solve the problem of the sample size being small: one problem is that the number of both black and white samples is too small to support the use of the conventional machine learning model method; the other problem is that the number of black samples is too small such that the data magnitude cannot support the use of the conventional machine learning model method. In the present embodiment, a Markov Chain Monte Carlo (MCMC) model is used as the security model to solve the problem of the sample size being small. The specific processing process is as follows:

1) Analyzing existing identification security samples to obtain sample distribution.

It is assumed that the five parameters (the regression coefficients) are independent from one another and comply with prior normal distribution with an average of 0 and a standard deviation of X.

2) Defining the nonstandard log posterior distribution probability density (i.e., a prior function is multiplied by a likelihood function).

3) Generating random data to simulate posterior distribution of an identification security model.

In other words, the samples of the MCMC model need to be obtained by sampling the posterior distribution.

4) Adjusting a scale parameter of the proposal (i.e., a variance of a random walk MH algorithm) to obtain a more reasonable acceptance probability.

The scale parameter is changed, the larger the parameter value is, the more obvious is the state transition of the Markov chain (the sample autocorrelation is weakened), but the lower the acceptance probability is at the same time, so this is a choice that needs to take both into account.

5) Finding a scale value suitable for the acceptance probability, increasing the simulation times according to this parameter, and then observing whether the result converges. When the result converges, the simulated samples are obtained.

The data magnitude of the simulated samples is larger than the data magnitude of the initial identification security samples, thus meeting the needs of MCMC model training.

6) Performing training based on the simulated samples to obtain an initial identification security model.

At a later stage, the identification security model is optimized according to continuously increasing samples after running online.

Through the identification security model generated in the present embodiment, after a breakthrough event is known, the first identification products corresponding to the known breakthrough event and the first identification success rates of the first identification products may be input, so as to determine the identification products with higher identification security applicable to determining the breakthrough event.

In addition, by using the identification security model, assuming that the user event is a secure event, the first identification success rates of the first identification products corresponding to the user can be obtained, thus obtaining the first identification products and first identification product combination with higher identification security applicable to the user.

Figure 6:
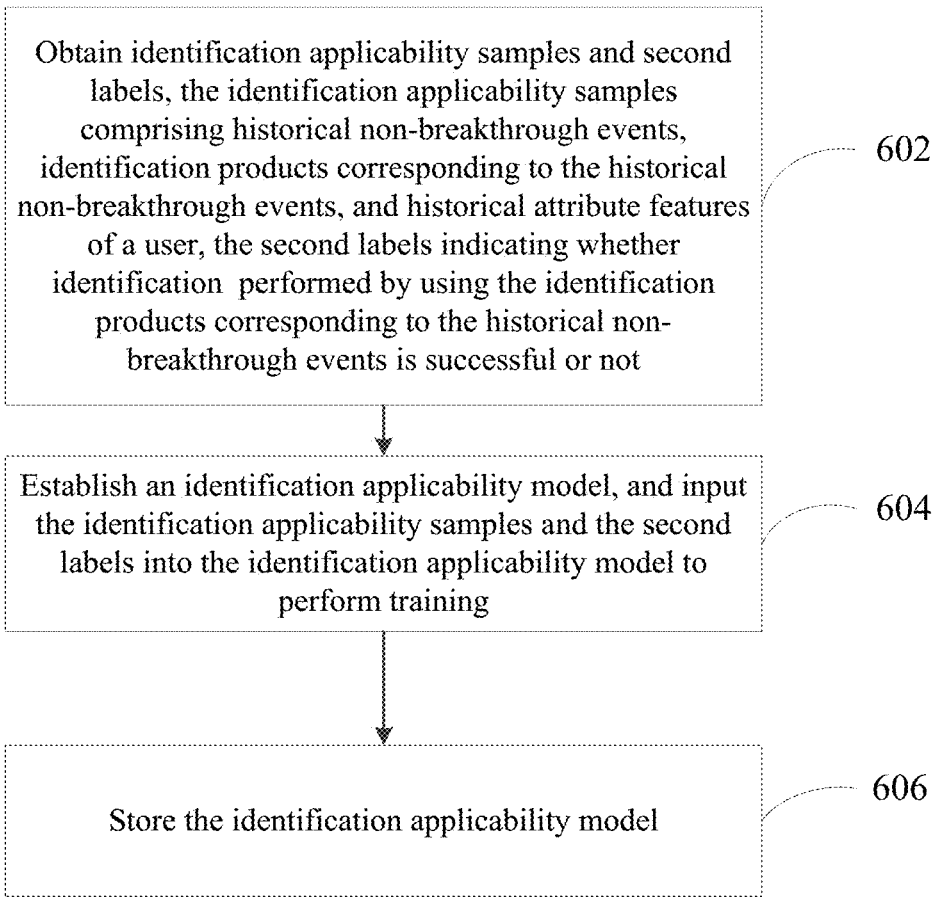
FIG. 6 is a flowchart of a method for generating an identification applicability model according to one or more embodiments of the present application.

One embodiment of the present application further discloses a method for generating an identification applicability model. Referring to FIG. 6, the method includes the following steps:

602, obtaining identification applicability samples and second labels, the identification applicability samples include historical non-breakthrough events, identification products corresponding to the historical non-breakthrough events, and historical attribute features of a user, and the second labels indicating whether identification performed by using the identification products corresponding to the historical non-breakthrough events is successful or not.

It can be seen from this step that the samples of the identification applicability model include black samples, that is, historical non-breakthrough events in which identification passes; and white samples, that is, historical non-breakthrough events in which identification does not pass.

604, establishing an identification applicability model, and inputting the identification applicability samples and the second labels into the identification applicability model to perform training.

606, storing the identification applicability model.

In the present embodiment, the generated identification applicability model may be used to determine whether the identification products corresponding to an input event match the historical attribute features of the user.

In the present embodiment, the identification applicability model may be a random forest algorithm model.

In machine learning, a random forest algorithm consists of many decision trees, because these decision trees are formed using a random method, so they are also called random decision trees. The trees in the random forest algorithm model are not associated. When test data enters the random forest algorithm model, it actually makes each decision tree to classify, and finally regard the classification with the most classification results among all the decision trees as the final result. Therefore, the random forest algorithm model is a classifier including a plurality of decision trees, and the output classification is determined by the mode of the classifications output by individual trees. The random forest algorithm model can process both measure with attributes which are discrete values, such as ID3 algorithm, and measure with attributes which are continuous values, such as C4.5 algorithm.

A process of constructing the random forest algorithm model is as follows:

1) If there are N samples, then there are N randomly selected samples that are put back (one sample is randomly selected at one time, and then return for continuous selection). The selected N samples are used to train a decision tree as the samples at the root node of the decision tree.

2) If each sample has M attributes, when each node of the decision tree needs to be split, m attributes are randomly selected from the M attributes, satisfying the condition m<<M. Then a policy (such as information gain) is used to select one attribute from the m attributes as the splitting attribute of the node.

3) In the process of forming the decision tree, each node should be split according to step 2 (it is easy to understand that if the next attribute selected by this node is the one used just when the parent node is split, then the node has reached a leaf node and there is no need to continue splitting). The operation continues until no further splitting can be realized. It should be noted that there is no pruning in the entire process of forming the decision tree.

4) A large number of decision trees are established according to steps 1-3, thus forming a random forest model.

In the present embodiment, the generated identification applicability model may be used to determine whether the identification products corresponding to an input event match the historical attribute features of the user.

By using the identification applicability model, assuming that the user event is a non-secure event, the third identification success rates of the second identification products corresponding to the user are obtained, thus obtaining the second identification products and second identification product combination with higher identification applicability applicable to the user.

Figure 7:
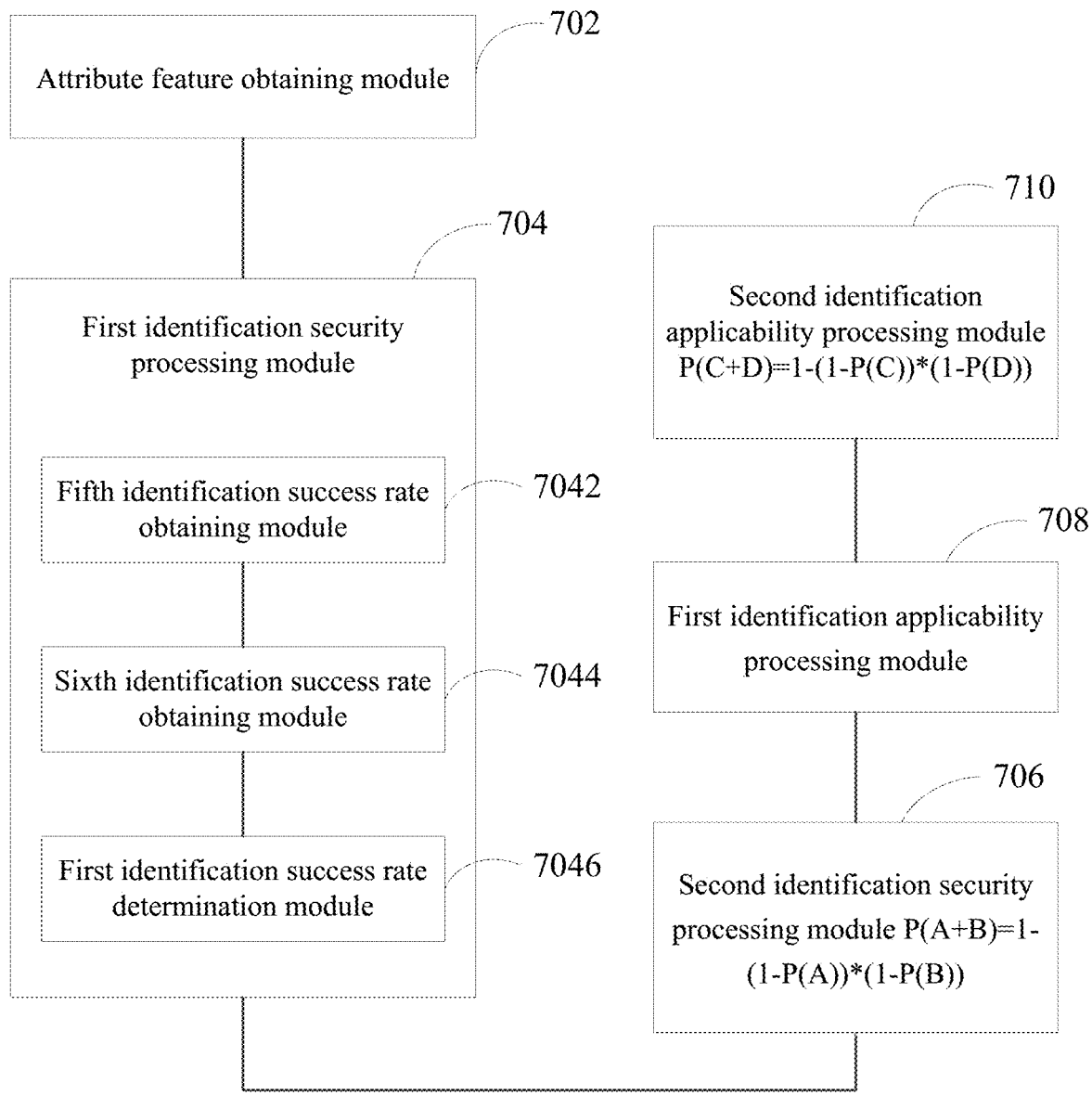
FIG. 7 is a structural schematic diagram of an identification apparatus according to one or more embodiments of the present application.

One embodiment of the present application further provides an identification apparatus. Referring to FIG. 7, the apparatus includes:

an attribute feature obtaining module 702, configured to obtain attribute features of a user;

a first identification security processing module 704, configured to input the attribute features of the user into a trained identification security model, and obtain, according to output results, first identification products corresponding to the attribute features of the user and first identification success rates of the first identification products;

a second identification security processing module 706, configured to generate first identification product combinations by any two of the first identification products, compute second identification success rates of the first identification product combinations according to the first identification success rates of the first identification products, and regard, as second identification product combinations, the first identification product combinations with a second identification success rate greater than a first threshold to obtain second identification products in the second identification product combinations;

a first identification applicability processing module 708, configured to input the second identification products and the attribute features of the user into a trained identification applicability model to obtain third identification success rates of the second identification products; and a second identification applicability processing module 710, configured to perform computation to obtain fourth identification success rates of the second identification product combinations according to the third identification success rates of the second identification products, and output second identification product combinations with a fourth identification success rate greater than a second threshold.

Optionally, the first identification security processing module 704 includes:

a fifth identification success rate obtaining module 7042, configured to input the attribute features of the user into the trained identification security model to obtain fifth identification success rates of the first identification products corresponding to the attribute features of the user;

a sixth identification success rate obtaining module 7044, configured to statistically compute sixth identification success rates of the first identification products corresponding to the attribute features of the user within a target time period; and a first identification success rate determination module 7046, configured to compare the fifth identification success rates of the first identification products with the sixth identification success rates, and regard the greater rates as the first identification success rates of the first identification products.

Optionally, the sixth identification success rate obtaining module 7044 is configured to divide risks within the target time period into risk groups, statistically compute an identification success rate of each risk group corresponding to the first identification products, and weigh the identification success rate of each risk group to obtain the six identification success rates of the first identification products.

Optionally, after second identification security processing module 706 obtains the second identification products in the second identification product combinations, the apparatus further includes:

a filtering module configured to filter the obtained second identification products according to a preset security control policy and input the filtered second identification products into the trained identification applicability model.

Optionally, second identification security processing module 706 is configured to compute the second identification success rates of the first identification product combinations through the following formula:

$P(A+B)=1-(1-P(A))*(1-P(B))$ where $P(A+B)$ is the second identification success rate of a first identification product combination;

$P(A)$ and $P(B)$ are respectively the first identification success rates of the first identification products.

The second identification applicability processing module 710 is configured to compute the fourth identification success rates of the second identification product combinations through the following formula:

$P(C+D)=1-(1-P(C))*(1-P(D))$ where $P(C+D)$ is the fourth identification success rate of a second identification product combination;

$P(C)$ and $P(D)$ are respectively the third identification success rates of the second identification products.

In the identification apparatus provided by the present application, after the attribute features of the user are obtained, the features are sequentially input into the trained identification security model and identification applicability model, and finally second identification product combinations generated by any two of the second identification products and having a fourth identification success rate greater than the second threshold, are output, thus improving security and improving user experience.

Figure 8:
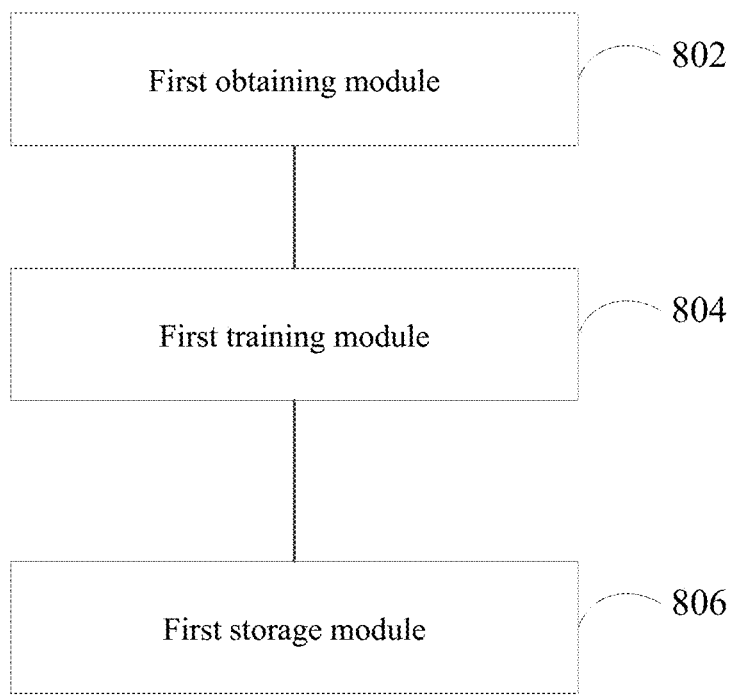
FIG. 8 is a structural schematic diagram of an apparatus for generating an identification security model according to one or more embodiments of the present application.

One embodiment of the present application further provides an apparatus for generating an identification security model. Referring to FIG. 8, the apparatus includes:

a first obtaining module 802, configured to obtain identification security samples and first labels, the identification security samples including historical breakthrough events, identification products corresponding to the historical breakthrough events, and historical attribute features of a user, the first labels indicating whether identification performed by using the identification products corresponding to the historical breakthrough events is successful or not;

a first training module 804, configured to establish an identification security model, and input the identification security samples and the first labels into the identification security model to perform training; and a first storage module 806, configured to store the identification security model.

The above is an exemplary solution of the apparatus for generating the identification security model according to the present embodiment. It should be noted that the technical solution of the apparatus for generating the identification security model belongs to the same concept as the technical solution of the method for generating the identification security model. For details not described in detail in the technical solution of the apparatus for generating the identification security model, please refer to the description of the technical solution of the method for generating the identification security model.

Figure 9:
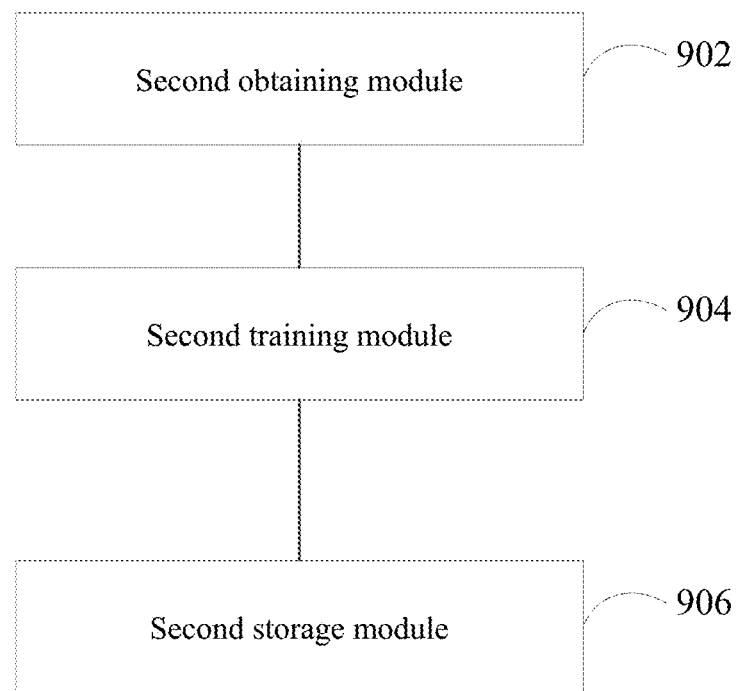
FIG. 9 is a structural schematic diagram of an apparatus for generating an identification applicability model according to one or more embodiments of the present application.

One embodiment of the present application discloses an apparatus for generating an identification applicability model. Referring to FIG. 9, the apparatus includes:

a second obtaining module 902, configured to obtain identification applicability samples and second labels, the identification applicability samples including historical non-breakthrough events, identification products corresponding to the historical non-breakthrough events, and historical attribute features of a user, the second labels indicating whether identification performed by using the identification products corresponding to the historical non-breakthrough events is successful or not;

a second training module 904, configured to establish an identification applicability model, and input the identification applicability samples and the second labels into the identification applicability model to perform training; and a second storage module 906, configured to store the identification applicability model.

The above is an exemplary solution of the apparatus for generating the identification applicability model according to the present embodiment. It should be noted that the technical solution of the apparatus for generating the identification applicability model belongs to the same concept as the technical solution of the method for generating the identification applicability model. For details not described in detail in the technical solution of the apparatus for generating the identification applicability model, please refer to the description of the technical solution of the method for generating the identification applicability model.

One embodiment of the present application further provides a computing device, including a memory, a processor, and computer instructions that are stored on the memory and that can be executed on the processor; the processor, when executing the instructions, implements the steps of the identification method, the method for generating the identification security model, or the method for generating the identification applicability model.

One embodiment of the present application further provides a computer-readable storage medium on which computer instructions are stored; the instructions are executed by a processor to implement the steps of the identification method, the method for generating the identification security model, or the method for generating the identification applicability model.

Figure 10:
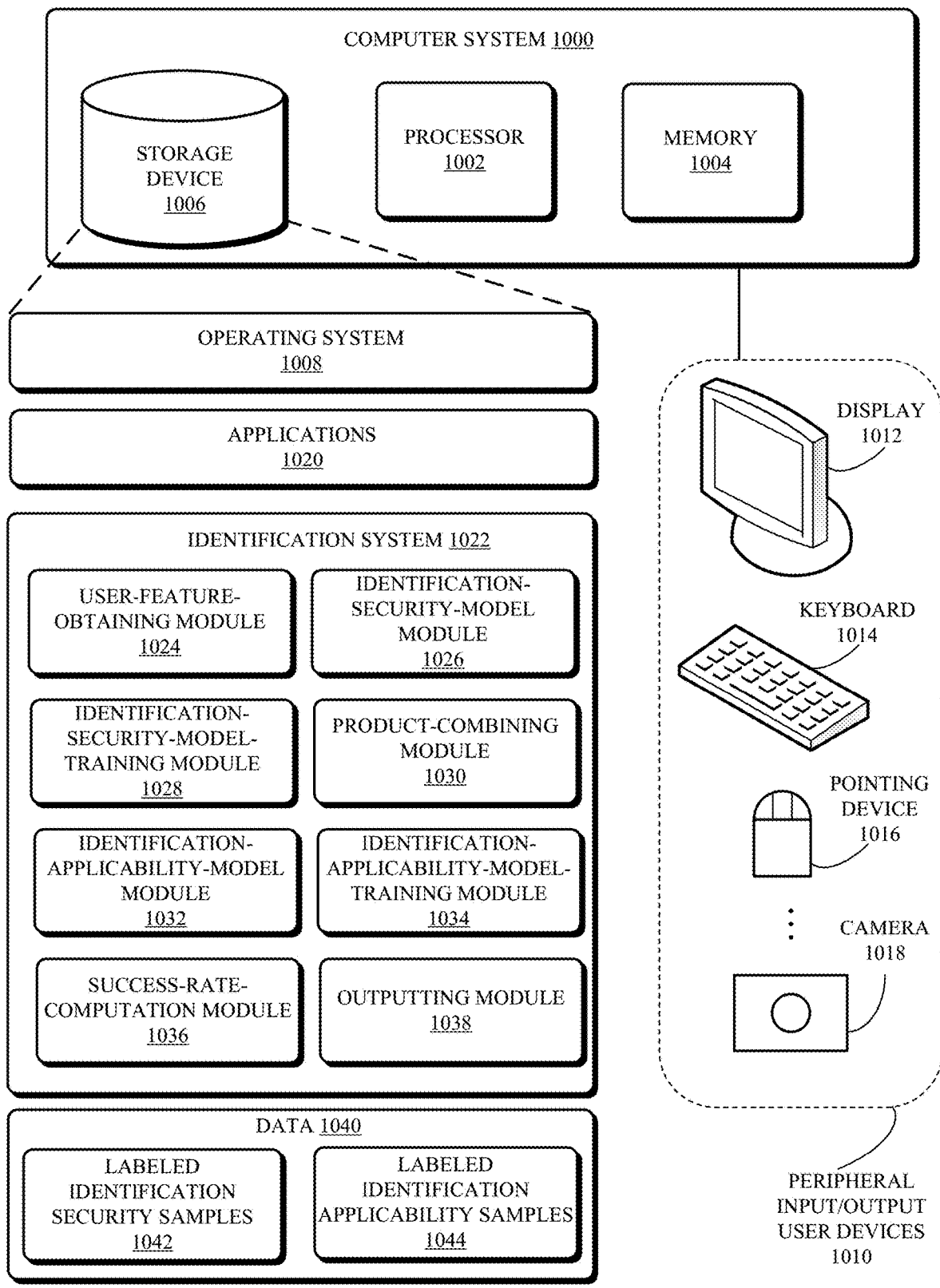
FIG. 10 illustrates an exemplary computer and communication system for identification, according to one embodiment

FIG. 10 illustrates an exemplary computer and communication system for identification, according to one embodiment. In FIG. 10, computer system 1000 can include a processor 1002, a memory 1004, and a storage device 1006. Furthermore, computer system 1000 can be coupled to peripheral input/output (I/O) user devices 1010, e.g., a display device 1012, a keyboard 1014, a pointing device 1016, and a camera 1018. Storage device 1006 can store an operating system 1008, one or more applications 1020, an identification system 1022, and data 1040. In one embodiment, computer system 1000 can be a mobile terminal device of a user.

Applications 1020 can include instructions, which can be loaded from storage device 1006 into memory 1004 and executed by processor 1002. As a result, computer system 1000 can perform specific functions provided by applications 1020.

Identification system 1022 can include instructions, which when executed by computer system 1000, can cause computer system 1000 or processor 1002 to perform methods and/or processes described in this disclosure. Specifically, identification system 1022 can include instructions for obtaining attribute features of users (user-feature-obtaining module 1024), instructions for implementing an identification security model (identification-security-model module 1026), instructions for training the identification security model (identification-security-model-training module 1028), instructions for selecting and combining identification products to generate identification product combinations (product-combining module 1030), instructions for implementing an identification applicability model (identification-applicability-model module 1032), instructions for training the identification security model (identity-security-model-training module 1034), instructions for computing success rates of identification product combinations (success-rate-computation module 1036), and instructions for outputting identification product combinations meeting the requirements (outputting module 1038).

Data 1040 can include labeled identification security samples 1042 and labeled identification applicability samples 1044.

In some embodiments, applications 1020 and the various modules in identification system 1022, such as modules 1024, 1026, 1028, 1030, 1032, 1034, 1036, and 1038 can be partially or entirely implemented in hardware and can be part of processor 1002. Further, in some embodiments, the system may not include a separate processor and memory. Instead, in addition to performing their specific tasks, modules 1020, 1024, 1026, 1028, 1030, 1032, 1034, 1036, and 1038, either separately or in concert, may be part of general- or special-purpose computation engines.

The above is an exemplary solution of the computer-readable storage medium according to the present embodiment. It should be noted that the technical solution of the storage medium belongs to the same concept as the technical solution of the identification method, the method for generating the identification security model, or the method for generating the identification applicability model. For details not described in detail in the technical solution of the storage medium, please refer to the description of the technical solution of the identification method, the method for generating the identification security model, or the method for generating the identification applicability model.

The computer instructions include computer program codes, which may be in the form of source codes, object codes, executable files or some intermediate forms, etc. The computer-readable medium may include any entity or apparatus capable of carrying the computer program codes, a recording medium, a USB disk, a mobile hard disk, a magnetic disk, an optical disk, a computer memory, a read-only memory (ROM), a random access memory (RAM), an electric carrier signal, a telecommunication signal, a software distribution medium, etc. It should be noted that the content of the computer-readable medium may be appropriately increased or decreased according to the requirements of the legislation and patent practice in the jurisdiction. For example, in some jurisdictions, according to the legislation and patent practice, the computer-readable medium does not include electric carrier signal and telecommunication signal.

It should be noted that, for the sake of simple description, all the above-mentioned method embodiments are described as a series of action combinations. However, those skilled in the art should be aware that the present application is not limited by the action sequence described, because according to the present application, some steps may be performed in other order or simultaneously. Secondly, those skilled in the art should also know that the embodiments described in the description are preferred embodiments, and the actions and modules involved are not certainly necessary for the present application.

In the above embodiments, the description of each embodiment has its own emphasis. For the part not detailed in one embodiment, please refer to the relevant description of other embodiments.

The above disclosed preferred embodiments of the present application are only used to help describe the present application. The alternative embodiments do not describe all details in detail, and do not limit the present application to only the specific embodiments described. Obviously, many modifications and changes may be made according to the content of the description. The description selects and specifically describes these embodiments in order to better explain the principle and practical application of the present application, such that those skilled in the art can well understand and use the present application. The present application is limited only by the claims, and full scope and equivalents thereof.

What is claimed is:

1. A computer-executed method, the method comprising:
obtaining attribute features of a user;
determining, by a computer, a first set of identification products and identification success rates thereof based on the attribute features of the user and a first machine-learning model for determining identification security;
generating a first set of identification product combinations, wherein a respective identification product combination comprises two different identification products selected from the first set identification products;
selecting, from the first set of identification product combinations, a second set of identification product combinations based on the identification success rates of the first set of identification products; and
selecting, from the second set of identification product combinations, a third set of identification product combinations based on the attribute features of the user and a second machine-learning model for determining identification applicability, thereby facilitating identification of the user using at least one of the third set of the identification product combinations.

2. The method according to claim 1, wherein selecting, from the first set of identification product combinations, the second set of identification product combinations comprises:
computing combined identification success rate for each of the first set of identification product combinations based on the identification success rate of each identification product; and
in response to the combined identification success rate of an identification product combination being greater than a first threshold, including the identification product combination in the second set of identification product combinations.

3. The method according to claim 1, wherein selecting, from the second set of identification product combinations, the subset of identification product combinations comprises:
forming a second set of identification products using identification products included in the second set of identification product combinations;
for each identification product in the second set of identification products, determining an applicability-related identification success rate by inputting the identification product and the attribute features of the user into the second machine-learning model for determining identification applicability;
computing a combined applicability-related identification success rate for each of the second set of identification product combinations based on the applicability-related identification success rate of each identification product in the second set of identification products; and
in response to the combined applicability-related identification success rate of an identification product combination being greater than a second threshold, including the identification product combination in the subset of identification product combinations.

4. The method according to claim 3, wherein forming the second set of identification products further comprising applying a filter based on a predetermined security control policy.

5. The method according to claim 1, wherein determining the first identification products and the identification success rates thereof comprises:
determining a long-term identification success rate of a respective identification product based on the attribute features of the user;
determining a short-term identification success rate of the identification product corresponding to a target time period;
using a greater value of the long-term and short-term identification success rates of the identification product as the identification success rate of the first identification product.

6. The method according to claim 5, wherein determining the short-term identification success rate of the identification product comprises:
dividing potential risks associated with the identification product within the target time period into risk groups;
statistically computing an identification success rate of each risk group; and weighing identification success rates of the risk groups to obtain the short-term identification success rate of the identification product.

7. The method according to claim 1, further comprising training the first machine-learning model for determining identification security, which comprises:
obtaining identification security samples and first labels, wherein a respective identification security sample comprises a historical breakthrough event, an identification product corresponding to the historical breakthrough event, and historical attribute features of a user, and wherein a first label corresponding to the respective identification security sample indicates whether identification performed using the identification product corresponding to the historical breakthrough event is successful or not; and
training the first machine-learning model for determining identification security using the identification security samples and the first labels.

8. The method according to claim 1, wherein the first machine-learning model for determining identification security comprises a Markov Chain Monte Carlo (MCMC) model.

9. The method according to claim 1, further comprising training the second machine-learning model for determining identification applicability, which comprises:
obtaining identification applicability samples and second labels, wherein a respective identification applicability sample comprises a historical non-breakthrough event, identification product corresponding to the historical non-breakthrough event, and historical attribute features of a user, and wherein a second label corresponding to the respective identification applicability sample indicates whether identification performed using the identification product corresponding to the historical non-breakthrough event is successful or not; and
training the second machine-learning model for determining identification applicability using the identification applicability samples and the second labels.

10. The method according to claim 1, wherein the second machine-learning model for determining identification applicability comprises a random forest model.

11. A computer system, comprising:
a processer;
a storage device coupled to the processor and storing instructions, which when executed by the processor cause the processor to perform a method, the method comprising:
obtaining attribute features of a user;
determining a first set of identification products and identification success rates thereof based on the attribute features of the user and a first machine-learning model for determining identification security;
generating a first set of identification product combinations, wherein a respective identification product combination comprises two different identification products selected from the first set identification products;
selecting, from the first set of identification product combinations, a second set of identification product combinations based on the identification success rates of the first set of identification products; and
selecting, from the second set of identification product combinations, a third set of identification product combinations based on the attribute features of the user and a second machine-learning model for determining identification applicability, thereby facilitating identification of the user using at least one of the third set of the identification product combinations.

12. The computer system according to claim 11, wherein selecting, from the first set of identification product combinations, the second set of identification product combinations comprises:
computing combined identification success rate for each of the first set of identification product combinations based on the identification success rate of each identification product; and
in response to the combined identification success rate of an identification product combination being greater than a first threshold, including the identification product combination in the second set of identification product combinations.

13. The computer system according to claim 11, wherein selecting, from the second set of identification product combinations, the subset of identification product combinations comprises:
forming a second set of identification products using identification products included in the second set of identification product combinations;
for each identification product in the second set of identification products, determining an applicability-related identification success rate by inputting the identification product and the attribute features of the user into the second machine-learning model for determining identification applicability;
computing a combined applicability-related identification success rate for each of the second set of identification product combinations based on the applicability-related identification success rate of each identification product in the second set of identification products; and
in response to the combined applicability-related identification success rate of an identification product combination being greater than a second threshold, including the identification product combination in the subset of identification product combinations.

14. The computer system according to claim 13, wherein forming the second set of identification products further comprising applying a filter based on a predetermined security control policy.

15. The computer system according to claim 11, wherein the method further comprises training the first machine-learning model for determining identification security, which comprises:
obtaining identification security samples and first labels, wherein a respective identification security sample comprises a historical breakthrough event, an identification product corresponding to the historical breakthrough event, and historical attribute features of a user, and wherein a first label corresponding to the respective identification security sample indicates whether identification performed using the identification product corresponding to the historical breakthrough event is successful or not; and
training the first machine-learning model for determining identification security using the identification security samples and the first labels.

16. The computer system according to claim 11, wherein the first machine-learning model for determining identification security comprises a Markov Chain Monte Carlo (MCMC) model.

17. The computer system according to claim 11, wherein the method further comprises training the second machine-learning model for determining identification applicability, which comprises:
obtaining identification applicability samples and second labels, wherein a respective identification applicability sample comprises a historical non-breakthrough event, identification product corresponding to the historical non-breakthrough event, and historical attribute features of a user, and wherein a second label corresponding to the respective identification applicability sample indicates whether identification performed using the identification product corresponding to the historical non-breakthrough event is successful or not; and
training the second machine-learning model for determining identification applicability using the identification applicability samples and the second labels.

18. The computer system according to claim 11, wherein the second machine-learning model for determining identification applicability comprises a random forest model.

19. A non-transitory computer-readable storage medium storing instructions that when executed by a computer cause the computer to perform a method, the method comprising:
    obtaining attribute features of a user;
    determining, by a computer, a first set of identification products and identification success rates thereof based on the attribute features of the user and a first machine-learning model for determining identification security;
    generating a first set of identification product combinations, wherein a respective identification product combination comprises two different identification products selected from the first set identification products;
    selecting, from the first set of identification product combinations, a second set of identification product combinations based on the identification success rates of the first set of identification products; and
    selecting, from the second set of identification product combinations, a third set of identification product combinations based on the attribute features of the user and a second machine-learning model for determining identification applicability, thereby facilitating identification of the user using at least one of the third set of the identification product combinations.

20. The non-transitory computer-readable storage medium according to claim 19, wherein selecting, from the first set of identification product combinations, the second set of identification product combinations comprises:
    computing combined identification success rate for each of the first set of identification product combinations based on the identification success rate of each identification product; and
    in response to the combined identification success rate of an identification product combination being greater than a first threshold, including the identification product combination in the second set of identification product combinations.

21. The non-transitory computer-readable storage medium according to claim 19, wherein selecting, from the second set of identification product combinations, the subset of identification product combinations comprises:
    forming a second set of identification products using identification products included in the second set of identification product combinations;
    for each identification product in the second set of identification products, determining an applicability-related identification success rate by inputting the identification product and the attribute features of the user into the second machine-learning model for determining identification applicability;
    computing a combined applicability-related identification success rate for each of the second set of identification product combinations based on the applicability-related identification success rate of each identification product in the second set of identification products; and
    in response to the combined applicability-related identification success rate of an identification product combination being greater than a second threshold, including the identification product combination in the subset of identification product combinations.

22. The non-transitory computer-readable storage medium according to claim 21, wherein forming the second set of identification products further comprising applying a filter based on a predetermined security control policy.

23. The non-transitory computer-readable storage medium according to claim 19, wherein the method further comprises training the first machine-learning model for determining identification security, which comprises:
    obtaining identification security samples and first labels, wherein a respective identification security sample comprises a historical breakthrough event, an identification product corresponding to the historical breakthrough event, and historical attribute features of a user, and wherein a first label corresponding to the respective identification security sample indicates whether identification performed using the identification product corresponding to the historical breakthrough event is successful or not; and
    training the first machine-learning model for determining identification security using the identification security samples and the first labels.

24. The non-transitory computer-readable storage medium according to claim 19, wherein the first machine-learning model for determining identification security comprises a Markov Chain Monte Carlo (MCMC) model.

25. The non-transitory computer-readable storage medium according to claim 19, wherein the method further comprises training the second machine-learning model for determining identification applicability, which comprises:
    obtaining identification applicability samples and second labels, wherein a respective identification applicability sample comprises a historical non-breakthrough event, identification product corresponding to the historical non-breakthrough event, and historical attribute features of a user, and wherein a second label corresponding to the respective identification applicability sample indicates whether identification performed using the identification product corresponding to the historical non-breakthrough event is successful or not; and
    training the second machine-learning model for determining identification applicability using the identification applicability samples and the second labels.

26. The non-transitory computer-readable storage medium according to claim 19, wherein the second machine-learning model for determining identification applicability comprises a random forest model.

* * * * *